United States Patent [19]

Ball

[11] 4,398,859
[45] Aug. 16, 1983

[54] TRAILERS

[76] Inventor: Robert Ball, Hundred End Farm, Shore Rd., Hesketh Bank, Lancashire, England

[21] Appl. No.: 127,570

[22] Filed: Mar. 6, 1980

[51] Int. Cl.³ ............................................. B60P 1/00
[52] U.S. Cl. ................................................. 414/523
[58] Field of Search ............ 414/523, 508, 525 R, 414/525 A, 525 B, 526, 527, 528, 532; 198/317, 836

[56] References Cited

U.S. PATENT DOCUMENTS 2,293,486 8/1942 Barrett ................................ 414/523
2,321,387 6/1943 Jackson ........................... 414/523 X
2,570,530 10/1951 Domitrovic ......................... 414/523
3,724,168 4/1973 Cassady et al. ................. 414/523 X
3,863,783 2/1975 Spellman ............................ 414/523

Primary Examiner—James L. Rowland
Attorney, Agent, or Firm—LeBlanc, Nolan, Shur & Nies

[57] ABSTRACT

A vehicle or trailer having a chassis to which is pivotally connected an elevator or conveyor, the elevator or conveyor being movable from a position in which the elevator or conveyor extends transversely of the longitudinal axis of the vehicle or trailer from one side thereof to a position in which the elevator or conveyor is substantially parallel to the axis of the vehicle or trailer and lies within the overall confines thereof.

11 Claims, 2 Drawing Figures

TRAILERS

This invention relates to trailers or other vehicles and more particularly, but not exclusively, to an agricultural trailer which is adapted to be towed by an agricultural tractor when harvesting crops.

Crops such as cabbages, lettuces or the like are conventionally planted in spaced-apart rows or drills and then grow until the crop reaches maturity and is ready for harvesting. However, individual plants grow at different rates and it is necessary during harvesting a crop such as cabbages to select and cut the mature plants whilst leaving immature plants to grow for a longer period.

Consequently, it is necessary for personnel to walk down the rows of plants such as cabbages and to select and cut the mature cabbages. When each mature cabbage has been cut it is then passed to one or more packers for packing into boxes. The packers are usually riding on a trailer which is being towed by an agricultural tractor down the rows of plants adjacent to the personnel who are cutting the plants.

Clearly it is desirable for several cutters to walk down the field so that a number of rows of plants can be harvested during a single pass of the tractor and trailer down the field but where several cutters are working together in line abreast it is necessary for each cut plant to be passed to the trailer and the cutter furthest away from the trailer has to walk several yards across the rows of plants to the trailer or more usually throws the cut plant onto the trailer. Although, throwing the cut plant onto the trailer avoids the necessity for the cutters to walk to the trailer each time a plant is cut it does result in the harvested plant such as a cabbage being bruised which reduces the quality of the plant.

The object of this invention is to provide a trailer or other vehicle which alleviates the above disadvantages during the harvesting of a crop such as cabbages, lettuces or the like.

According to this invention, a vehicle or a trailer which is adapted to be connected to a towing vehicle comprises a chassis having at least one pair of wheels rotatably mounted thereon, a main load-carrying platform mounted on the chassis and an elevator or conveyor pivotally connected to the chassis, wherein the elevator or conveyor is pivotally movable from an operative position in which the elevator or conveyor extends transversely of the longitudinal axis of the vehicle or trailer from one side thereof to an out of use position in which the elevator or conveyor extends parallel to or substantially parallel to the longitudinal axis of the vehicle or trailer.

Preferably, in the out of use position, the elevator or conveyor lies within the overall confines of the vehicle or trailer. Preferably, also, in the out of use position, the elevator or conveyor is disposed beneath the main load-carrying platform. The elevator or conveyor is, preferably, pivotally connected to one end of a pivot arm and the other end of the pivot arm is pivotally connected to the chassis. The elevator or conveyor thus pivots inwardly and rearwardly of the vehicle or trailer during movement thereof form the operative to the out of use position.

Preferably, in the operative position, the inner end of the elevator or conveyor extends inwardly of the vehicle or trailer from the side edge towards the longitudinal centre line thereof. Preferably, also, the inner end of the elevator or conveyor is provided with releasable engaging means for connecting said inner end to the chassis in the operative position thereof. Preferably, also one or more support struts is or are provided which are adapted to be connected between the elevator or conveyor and the chassis to support the elevator or conveyor in the operative position on the vehicle or trailer.

The elevator or conveyor is, preferably, provided at each side edge with side boards which are each pivotally connected to the elevator or conveyor so as to be capable of being folded downwardly onto the upper face of the elevator or conveyor when the elevator or conveyor is moved to the out of use position. Preferably, the elevator or conveyor has an endless belt driven by a hydraulic motor and fluid under pressure for operating the motor may be supplied from a hydraulic system of the towing vehicle particularly when the towing vehicle is an agricultural tractor.

Preferably, the vehicle or trailer is provided at the rear end of the main load-carrying platform with a secondary platform disposed at a lower level than the main load-carrying platform. Preferably, also, the vehicle or trailer is provided at its side edges with upwardly extending members which support a roof extending over the main and secondary platforms and the sides of the vehicle or trailer between the platforms and the roof may be enclosed by one or more side curtains.

A preferred embodiment of this invention will now be described, by way of example only, with reference to the accompanying drawings of which:

Figure 1:
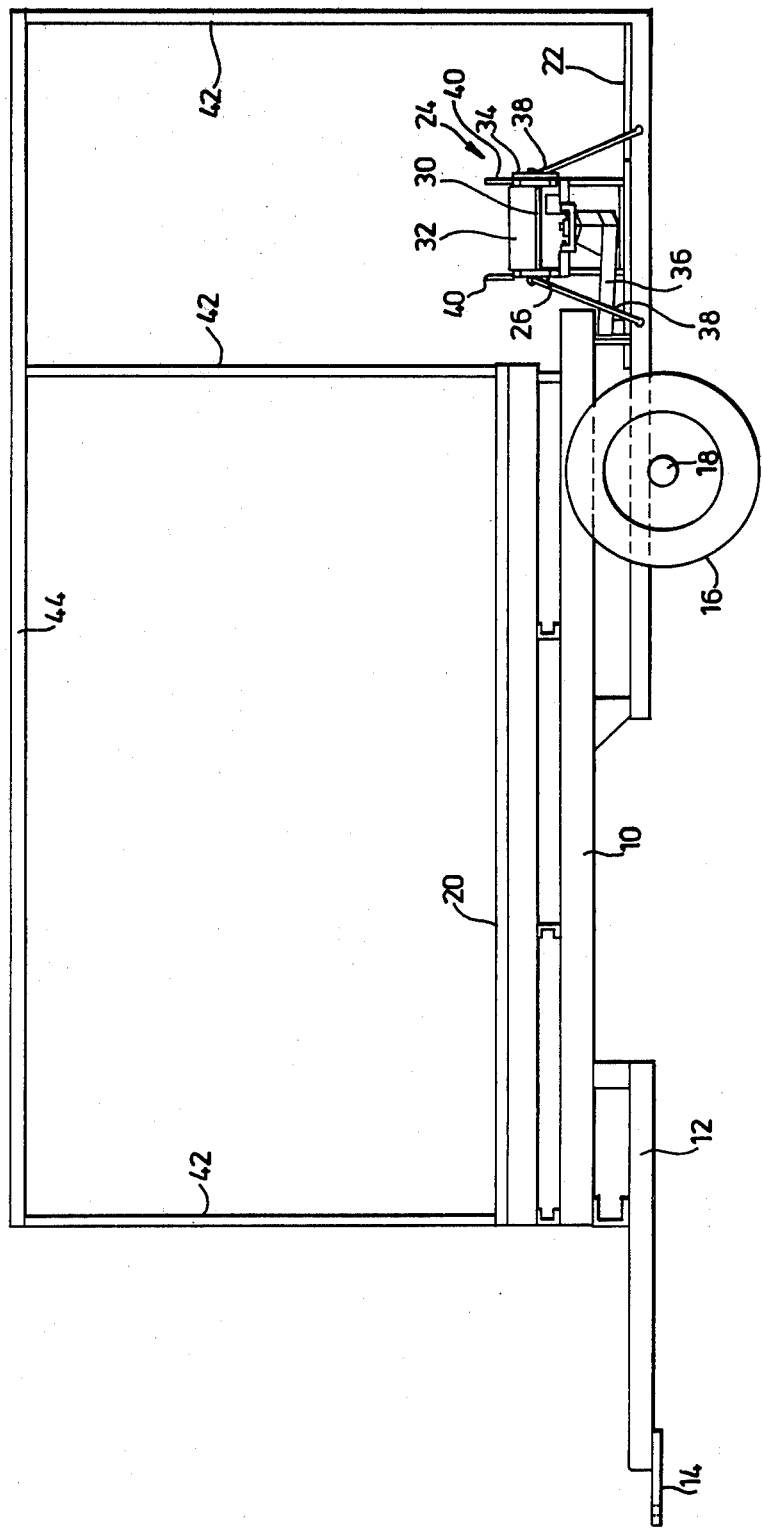
FIG. 1 is a diagrammatic side elevation of a trailer.

Referring now to the drawings, a trailer which is adapted to be towed by an agricultural tractor or other towing vehicle (not shown) comprises a chassis 10 provided at the front end thereof with an A-shaped extension 12 having a towing eye 14 mounted thereon by means of which the trailer is connected to the drawbar of the agricultural tractor (not shown). Two spaced-apart wheels 16 are mounted on an axle 18 extending transversely of the trailer and connected to the chassis 10.

A main load-carrying platform 20 is mounted on the chassis 10 and at the rear end thereof a secondary platform 22 is also mounted on the rear portion of the chassis 10. The platform 22 is disposed at a level lower than the platform 20 so that when an operative stands upon the platform 22, the platform 20 is at a convenient working height to allow the operative to place articles onto the main platform 20.

Figure 2:
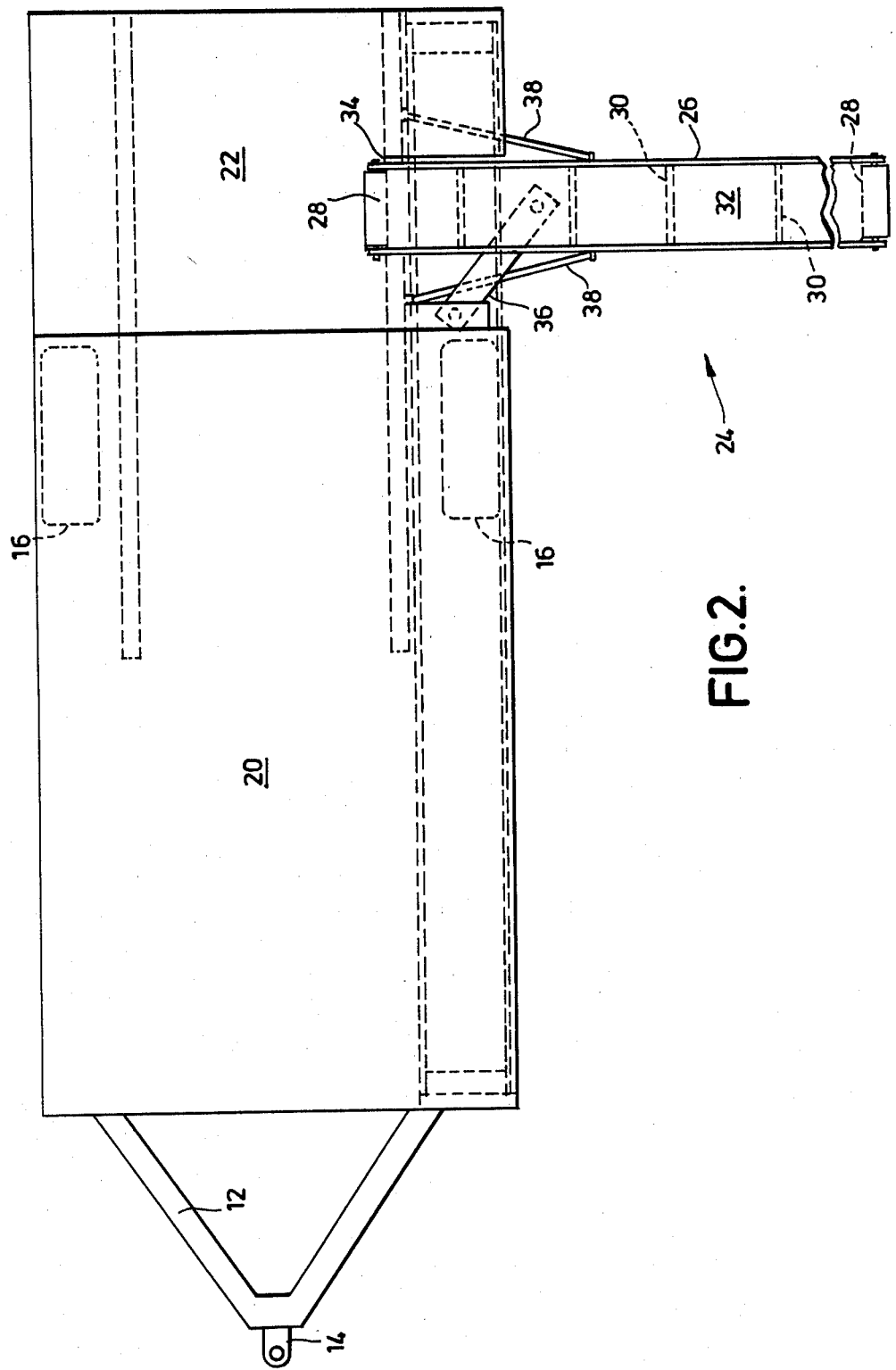
FIG. 2 is a diagrammatic plan view of the trailer.

An elevator or conveyor indicated generally at 24 is mounted on the chassis 10 and is arranged to be pivotally movable relatively thereto from an operative position shown in the drawings in which the elevator 24 extends from one side of the trailer to an out of use position shown in broken lines in FIG. 2 of the drawings.

The elevator 24 comprises an elongate framework 26 having main rollers 28 mounted at the outer and inner end thereof and a series of spaced-apart intermediate rollers 30. An endless belt 32 extends around the main rollers 28 at the inner and outer ends of the framework 26 and between these rollers 28 rests upon and is supported by the intermediate rollers 30. The main roller 28 at the inner end of the framework 26 of the elevator 24 is drivably connected by a chain and sprocket drive 34 to a hydraulic motor (not shown). The hydraulic motor is supplied with fluid under pressure from the hydraulic system of the agricultural tractor and drives the roller 28 at the inner end of the elevator 24 so that the upper run of the endless belt 32 moves during operation continuously from the outer end of the elevator 24 towards the inner end thereof. Consequently, plants such as cabbages or lettuces placed on the elevator 24 are moved progressively towards the trailer.

The framework 26 is pivotally connected at a point adjacent to but spaced-apart from the inner end thereof to one end of a pivot arm 36 and is capable of pivotal movement relatively thereto about not only a vertical axis but also about a horizontal axis so that when the elevator 24 is in the operative position in which it extends from the side of the trailer, the pivot arm 36 is not subjected to undue stress.

The other end of the pivot arm 36 is pivotally connected to the chassis 10 for movement relatively thereto about a substantially vertical axis. The inner end of the framework 26 of the elevator 24 extends inwardly of the secondary platform 22 towards the longitudinal centre line of the trailer and engaging means (not shown) is provided thereon in the form of L-shaped lugs which are adapted to engage beneath similarly shaped projections secured to the chassis 10 so that in the operative position of the elevator 24 shown in the drawings the elevator 24 is supported thereby in a substantially horizontal plane.

The elevator 24 is provided with additional support in this operative position by means of two support struts 38 releasably connected between the sides of the framework 26 and points on the chassis 10 disposed beneath the level of the elevator 24 and on each side thereof. The struts 38 are thus loaded in compression to sustain the elevator 24 in the horizontal plane and also afford support in a horizontal plane to retain the elevator 24 in the operative position where the elevator 24 extends transversely of the longitudinal axis of the trailer from one side thereof.

The elevator 24 is also provided with side boards 40 which are pivotally connected to the framework 26 and in their upright position assist in retaining plants on the belt 32 thereof. The side boards 40 are, when the elevator 24 is to be moved to the out of use position capable of being folded onto the upper surface of the elevator 24 to reduce the overall height thereof and facilitate stowage of the elevator 24.

The trailer is provided with upwardly extending members 42 disposed at each corner of the platform 20 and at the rear corners of the platform 22. A roof 44 is connected to the upper ends of the members 42 and extends over the full length and width of the platforms 20 and 22 to provide weather protection for operatives working on the trailer. Additional weather protection can be provided by enclosing the sides of the trailer with one or more side curtains extending between the edges of the roof 44 and the platforms 20 and 22.

In operation, the trailer is drawn by the agricultural tractor down a field containing a crop such as cabbages or lettuce where at least some of the plants are mature and suitable for harvesting. The trailer is drawn in usual manner along the rows of plants and the elevator 24 is disposed in its operative position where it extends from one side of the trailer over the rows of plants which are to be harvested.

The personnel who are to cut the crop walk behind the elevator 24 and the length thereof is arranged to be sufficient so that the elevator 24 extends across several rows of plants. It is found that each cutter is capable of surveying approximately three rows of plants for maturity and is able to cut the mature plants thereform and thus it is usually adequate for two cutters to walk in spaced-apart relationship behind the elevator 24 and for a further cutter to walk adjacent to the outer end of the elevator 24 to survey the three rows of plants immediately beyond the outer end of the elevator 24. Consequently, during a single pass of the trailer it should be possible for at least nine rows of plants to be harvested but this is dependent upon the length of the elevator 24 and the spacing between the rows of plants.

After an operative has cut a mature plant such as a cabbage, the elevator 24 is disposed within easy reach of the operative to enable the operative to place the cabbage thereon. The cabbage is then conveyed to the inner end of the elevator 24 where it is removed and packed by a further operative standing on the platform 22 of the trailer. The height of the inner end of the elevator 24 is arranged to be a convenient working height for the operative on the platform 22 and thus use of this trailer reduces the physical effort of the work which has to be carried out by the cutters and also the operatives who are packing the crop whilst also reducing the danger of the crop becoming bruised due to rough handling.

When the trailer is not in use for harvesting and is to be removed from the field at for example the end of a working day, the support struts 38 are disconnected from the elevator 24 and the chassis 10 and are stored in a rack (not shown) on one side of the chassis 10. The side boards 40 are folded downwardly onto the upper face of the elevator 24 and the elevator 24 is pivoted inwardly and rearwardly of the trailer to the out of use position shown in broken lines in FIG. 2 of the drawings. The major portion of the elevator 24 is disposed in this out of use position beneath the platform 20 whilst the remaining portion thereof is disposed on the platform 22 at one side thereof. Retaining clips (not shown) are provided on the chassis 10 for supporting the portion of the elevator 24 which is beneath the platform 20 in this out of use position. The elevator 24 is stored in a position which is wholly within the confines of the trailer thus enabling the trailer to be easily manoeuvred out of the field and on normal roads and in addition the trailer could then be used for other purposes as only a small portion of the secondary platform 22 is occupied by the elevator 24 in this out of use position.

It will be appreciated that this invention could also be readily applied to a vehicle such as a self propelled vehicle for example a harvester as well as to the trailer described above.

I claim:

1. A vehicle or trailer which is adapted to be connected to a towing vehicle comprising a chassis having at least one pair of wheels rotatably mounted thereon; a main load-carrying platform mounted on the chassis; a secondary platform disposed at a lower level than the main load-carrying platform and a pivotally mounted elevator, the elevator being pivotally movable from an operative position in which the elevator extends transversely of the longitudinal axis of the vehicle or trailer from one side thereof to an out of use position in which the elevator extends substantially parallel to the longitudinal axis of the vehicle or trailer and said elevator further being disposed below the main load-carrying platform in the out of use position.

2. A vehicle or trailer according to claim 1, wherein the elevator lies within the overall confines of the vehicle or trailer in the out of use position.

3. A vehicle or trailer according to claim 1, wherein the elevator is pivotally connected to one end of a pivot arm and the other end of the pivot arm is pivotally connected to the chassis.

4. A vehicle or trailer according to claim 1, wherein the inner end of the elevator extends inwardly of the vehicle or trailer from the side edge towards the longitudinal center line thereof.

5. A vehicle or trailer according to claim 1, wherein the inner end of the elevator is provided with releasable engaging means for connecting said inner end to the chassis in the operative position thereof.

6. A vehicle or trailer according to claim 1, wherein at least one support strut is provided which is adapted to be connected between the elevator and the chassis to support the elevator in the operative position on the vehicle or trailer.

7. A vehicle or trailer according to claim 1, wherein the elevator is provided at each side edge with side boards which are each pivotally connected to the elevator so as to be capable of being folded downwardly onto the upper face of the elevator when the elevator is moved to the out of use position.

8. A vehicle or trailer according to claim 1, wherein the elevator has an endless belt driven by a hydraulic motor.

9. A vehicle or trailer according to claim 8, wherein the fluid under pressure for operating the motor is supplied from a hydraulic system of the towing vehicle.

10. A vehicle or trailer according to claim 1, wherein the secondary platform which is disposed at a lower level than the main load-carrying platform is provided at the rear end of the main load-carrying platform.

11. A vehicle or trailer according to claim 1, wherein upwardly extending members are provided at the side edges which members support a roof extending over the main and secondary platforms.

* * * * *